(12) United States Patent
Gosain (10) Patent No.: US 8,874,455 B2
(45) Date of Patent: Oct. 28, 2014

(54) CONVERGENCE OF CUSTOMER AND INTERNAL ASSETS

(75) Inventor: Hemant Gosain, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 2029 days.

(21) Appl. No.: 11/855,921

(22) Filed: Sep. 14, 2007

(65) Prior Publication Data

US 2009/0076872 A1 Mar. 19, 2009

(51) Int. Cl.
*G06Q 10/06* (2012.01)

(52) U.S. Cl.
CPC ............ *G06Q 10/0633* (2013.01); *G06Q 10/06* (2013.01)
USPC ........................................................ 705/7.12

(58) Field of Classification Search
CPC ...................................................... G06Q 10/00
USPC ........................................................ 705/7.12
See application file for complete search history.

(56) References Cited

U.S. PATENT DOCUMENTS

| 6,157,915 A * | 12/2000 | Bhaskaran et al. ........... 705/7.11 |
| 2002/0049803 A1 * | 4/2002 | Bandhole et al. ............. 709/104 |
| 2002/0143598 A1 * | 10/2002 | Scheer .............................. 705/9 |
| 2004/0024660 A1 * | 2/2004 | Ganesh et al. .................. 705/28 |

* cited by examiner

*Primary Examiner* — Romain Jeanty
(74) *Attorney, Agent, or Firm* — Kilpatrick Townsend & Stockton LLP (57) ABSTRACT

An information management system providing a consolidated representation of a plurality of assets is disclosed. According to one embodiment, the information management system includes a data repository operable to store a plurality of global asset definitions which represent enterprise-owned assets and customer-owned assets. In one embodiment, one global asset definition is stored as a record of an asset of the plurality of assets. The global asset definition includes a functional specification of the asset and a physical attribute of the asset. The system further includes a work management application communicatively coupled to the data repository which provides a work flow manager that is operable to determine a work flow associated with the global asset definition. The work flow manager is further operable to manage the execution of the work flow.

22 Claims, 6 Drawing Sheets

CONVERGENCE OF CUSTOMER AND INTERNAL ASSETS

BACKGROUND OF THE INVENTION

1. Field of the Invention

Embodiments of the present invention generally relate to data management, and more particularly relate to convergence of customer and internal assets.

2. Description of the Related Art

A centralized data repository and work management solution is a collection of software and/or hardware components that enables a business or enterprise to maintain a single, "master" source of data describing the physical attributes of assets in the business or enterprise that is accessible across multiple, heterogeneous information management systems and subsystems. Currently, software vendors such as Oracle Corporation and IBM offer two types of data management solutions for assets: a customer relationship management (CRM) solution and an enterprise resource planning (ERP) solution. These solutions are based on the ownership of the asset, where the CRM solution provides a centralized view of customer-owned assets and where the ERP solution provides a view of enterprise-owned assets. However, the software industry has thus far failed to provide a solution for centrally defining and managing the intersection of assets between CRM and ERP products.

The creation of a centralized definition of assets has become increasingly important in recent years as companies have started performing both customer-related business functions (e.g., product service, sales, etc.) as well as enterprise asset management (e.g., maintenance, operational requirements, etc.). In many instances, these companies are forced to invest in two separate systems, a CRM system for servicing and an ERP system for maintenance. These two system effectively perform the same functions but are distinguished based on ownership of the asset. For example, an electric utility company owns their own assets, such as transmission lines and the poles on which the transmission lines are mounted. There are also the assets owned by customers of the utility company, such as meters residing within the domestic abode. In order for the electric utility provider to manage both the company-owned assets and the customer-owned assets, the traditional solution was to invest in both CRM and ERP solutions. The customer service-oriented CRM application would track the customer-owned meters and billing, whereas the ERP system may track the internally-owned assets including the transmission lines and transformers. An exemplary ERP system is Oracle® Enterprise Asset Management (eAM). Both systems perform the same work flow functions—maintaining and tracking assets. A system which addresses the redundancies within the CRM and eAM systems would be more efficient than purchasing and operating two disparate systems.

To address the foregoing needs, prior solutions that recognize both customer-owned assets and enterprise/internal assets have attempted to integrate one system with another. This usually involves extracting the asset data from the separate CRM and eAM systems and forming an assimilated asset definition. However, this does not eliminate the data redundancy. The customer-owned asset and internal asset definitions continue to be persisted in the separate systems. Moreover, prior solutions leverage pre-existing business flows, which require the asset data on the separate systems to be synchronized during the flow of work execution. Furthermore, these types of solutions are generally created by third-party consulting services and are not out-of-the-box solutions. Thus, this approach is problematic for several reasons. First, it is inefficient because it doubles the amount of processing and memory resources required to maintain a single set of data (i.e., the asset data). Second, it is cumbersome because it requires synchronization of the extracted asset data with the CRM master data and the eAM master data on a periodic basis. Even with frequent synchronizations, there may be situations where the extracted data is stale, possibly leading to processing errors and a degraded quality of service to customers.

Another solution is to integrate customer-owned assets and internal assets within an e-business suite of applications. The usual solution is to combine the asset definitions from both systems into a single definition. This means the physical and financial definitions are combined. However, this solution is also problematic. It is cumbersome because financial systems do not need to recognize assets in the same way as non-financial systems. For example, an accounting system may represent ten laptop computers as a single entry, with a quantity of ten units, and may depreciate the single entry on the group of ten assets. On the other hand, the physical representation may include ten separate entries. With a combined asset definition, the accounting system must then depreciate each entry separately.

Moreover, where subsystems are not bundled in a suite of applications, inefficiencies are prevalent. Each subsystem is tightly coupled to its own work management module. However, the separate work management modules perform the same functions and tasks. It would be more efficient to have a single work management module in order to eliminate the redundancies.

BRIEF SUMMARY OF THE INVENTION

Embodiments of the present invention address the foregoing and other such problems by providing systems and methods for convergence of customer and internal assets by providing an information management system that can interoperate with a plurality of disparate application systems and can provide a consolidated representation of a plurality of assets, regardless of the ownership of the asset. Assets owned by disparate application systems may be represented by a global asset definition.

In one set of embodiments, an information management system provides a consolidated representation of a plurality of assets and includes a data repository and a work management application. The data repository is operable to store a plurality of global asset definitions representing enterprise-owned assets and customer-owned assets. Each global asset definition is stored as a record representing the asset in the data repository. The global asset definition includes a functional specification of the asset and a physical attribute of the asset. The work management application may be communicatively coupled to the data repository. The work management application may provide a work flow manager which is operable to determine a work flow associated with the global asset definition. The work flow may be determined using the functional specification as set out in the asset record. The work flow itself includes one or more tasks to be performed by one or more subsystems of the plurality of disparate application systems. In one embodiment, the one or more tasks are required for accomplishing the functional specification. The functional specification can include a statement of work which identifies a subject matter of the work that needs to be performed. Thus, the work flow includes tasks which are required to fulfill the statement of work. In some embodiments, the work flows may span across disparate application systems. For example, the work flows may encompass activities performed by a combination of CRM subsystems and ERP/eAM subsystems.

As used herein, "assets" refers to tangible, physical objects of value which are owned by the enterprise itself or which is purchased and owned by customers of the enterprise. For example, assets may include (but not limited to) products, machines and warehousing equipment for a manufacturing industry, transmission towers and generating equipment for a utility industry, oil rigs, ocean-based platforms, and pipelines for an oil and gas industry, and vehicles and machines for a waste management industry. Assets may be associated with various data including (but not limited to) physical attributes (e.g., size, color, etc.), ancillary attributes, and other such information.

In one set of embodiments, the global asset definition excludes attributes describing financial features of the asset. Thus, the global asset definition distinguishes between the physical and financial representations of assets, but does not distinguish between the ownership of the asset. In one embodiment, if a financial subsystem attempts to access the global definition of an asset, a process module is operable to disseminate a copy of the global asset definition to the financial subsystem. A local data repository associated with the financial subsystem may be configured to store the local copy of the global asset definition. The financial subsystem may then update the localized global asset definition with various attributes describing financial features of the asset. Accordingly, respect for the differences between the physical work flows and financial work flows is upheld.

A further understanding of the nature and the advantages of the embodiments disclosed herein may be realized by reference to the remaining portions of the specification and the attached drawings.

BRIEF DESCRIPTION OF THE DRAWINGS

The invention may best be understood by reference to the following description taken in conjunction with the accompanying drawings in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

Embodiments of the present invention provide methods and apparatus for convergence of customer assets and internal assets, which enable heterogeneous subsystems to access a centralized data source describing the physical, as opposed to financial, attributes of assets associated with an enterprise. Specific embodiments may be particularly useful for product and service providers who recognize the redundancy between customer and internal assets running on disparate information management systems. Current methods of customer and internal asset consolidation are performed via asset replication which is problematic because it can be inefficient, and can require significant overhead to synchronize. Embodiments of the present invention overcome these and other problems and facilitate the convergence of customer and internal assets.

In the description that follows, embodiments will be described in reference to subsystems on a platform for a software application, such as a database application. However, embodiments are not limited to any particular architecture, environment, application, or implementation. For example, although embodiments will be described in reference to CRM and eAM applications, aspects of the invention may be advantageously applied to any software application and platform. Therefore, the description of the embodiments that follows is for purposes of illustration and not limitation.

Figure 1:
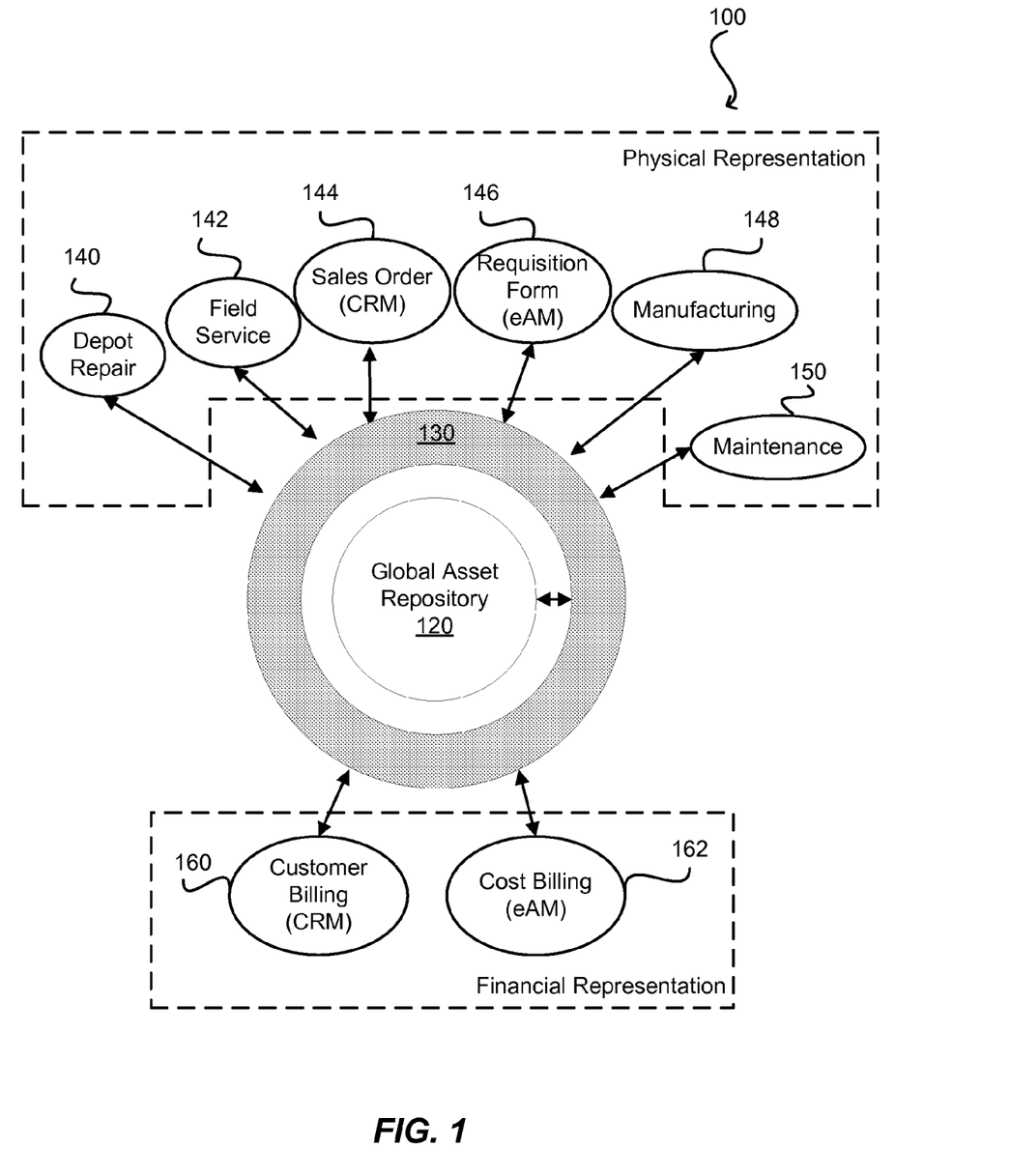
FIG. 1 illustrates an exemplary operating environment for global asset repository and work management application in accordance with one embodiment of the present invention.

FIG. 1 illustrates an exemplary operating environment for a global asset repository and work management application in accordance with one embodiment of the present invention. As shown, asset management system 100 includes a global asset repository 120 communicatively coupled to work management application 130. Work management application 130 is communicatively coupled to subsystems 140, 142, 144, 146, 148, 150. Subsystems 140, 142, and 144 are associated with systems relying on customer-owned assets, such as CRM systems, whereas subsystems 146, 148, and 150 are associated with systems relying on internally-owned assets, such as ERP/eAM systems. Subsystems 140, 142, 144, 146, 148, 150 are those which deal with the physical representation of an asset. Work management application 130 is also communicatively coupled to subsystems 160 and 162. Subsystems 160 and 162 are subsystems which deal with the financial representation of an asset. Global asset repository 120 is accessed by work management application 130. As discussed above, global asset repository 120 acts as a centralized source of consolidated asset definitions for both customer-owned and enterprise-owned assets associated with subsystems 140, 142, 144, 146, 148, 150. It should be mentioned that the subsystems shown are merely exemplary and for purposes of explanation. Those of ordinary skill in the art would appreciate that any number of other subsystems may also be communicatively coupled to the work management application 130.

In one set of embodiments, subsystems 140, 142, 144, 146, 148, 150 are bundled with one or more CRM and/or ERP/eAM systems of an enterprise and are interested in asset information based on the physical representation of the asset. These subsystems include, for example, depot repair, field service, demand for work from a sales order, demand for work from a requisition form, manufacturing, maintenance, and the like. Subsystems 160 and 162 may also be bundled with one or more CRM and/or ERP/eAM systems, but are interested in asset information based on the financial representation of the asset. These include, for example, cost billing and capitalization subsystems for enterprise-owned assets and customer billing subsystems for customer-owned assets. For instance, global asset repository 120 may contain global definitions for assets associated with the enterprise. Any of subsystems 140, 142, 144, 146, 148, 150 which are interested in the physical, as opposed to financial, definitions of the assets can access and update the global asset record in the repository 120.

Other subsystems which are interested in the financial definition of the enterprise's assets, such as subsystems 160 and 162, can access the global asset definitions in repository 120 via work management application 130, but cannot make updates to the global asset definition. Instead, these subsystems are treated as spoke systems operating with a data hub of a master data management system, such as the global asset repository 120. The spoke systems can import and synchronize the data from the hub into their local data repositories. Importation can be performed using a streaming loader program (e.g., XML-based loader), a batch-based program, or through manual entry of data. Once the asset data has been imported, the data may be cleansed by resolving data conflicts, removing duplicates, and augmenting the data to conform to a consistent format. By preventing the subsystems which rely on the financial representation of assets from updating the global asset definition of repository 120, the physical and financial definitions of the assets of the enterprise remain separate. This allows work flows based on the financial representation of the asset to be distinct from work flows based on the physical representation of the asset.

Thus, in one embodiment, the asset management system 100 includes two distinct asset definitions: a global asset definition relating to the physical representation of the asset, and a local subsystem-specific definition relating to the financial representation of the asset. The global asset definition is a centralized definition of the physical representation of the asset, regardless of the asset's ownership status. In essence, the global asset definition includes the physical representation of the asset as dictated by subsystems for customer-owned assets and/or subsystems for internally-owned assets.

Figure 2:
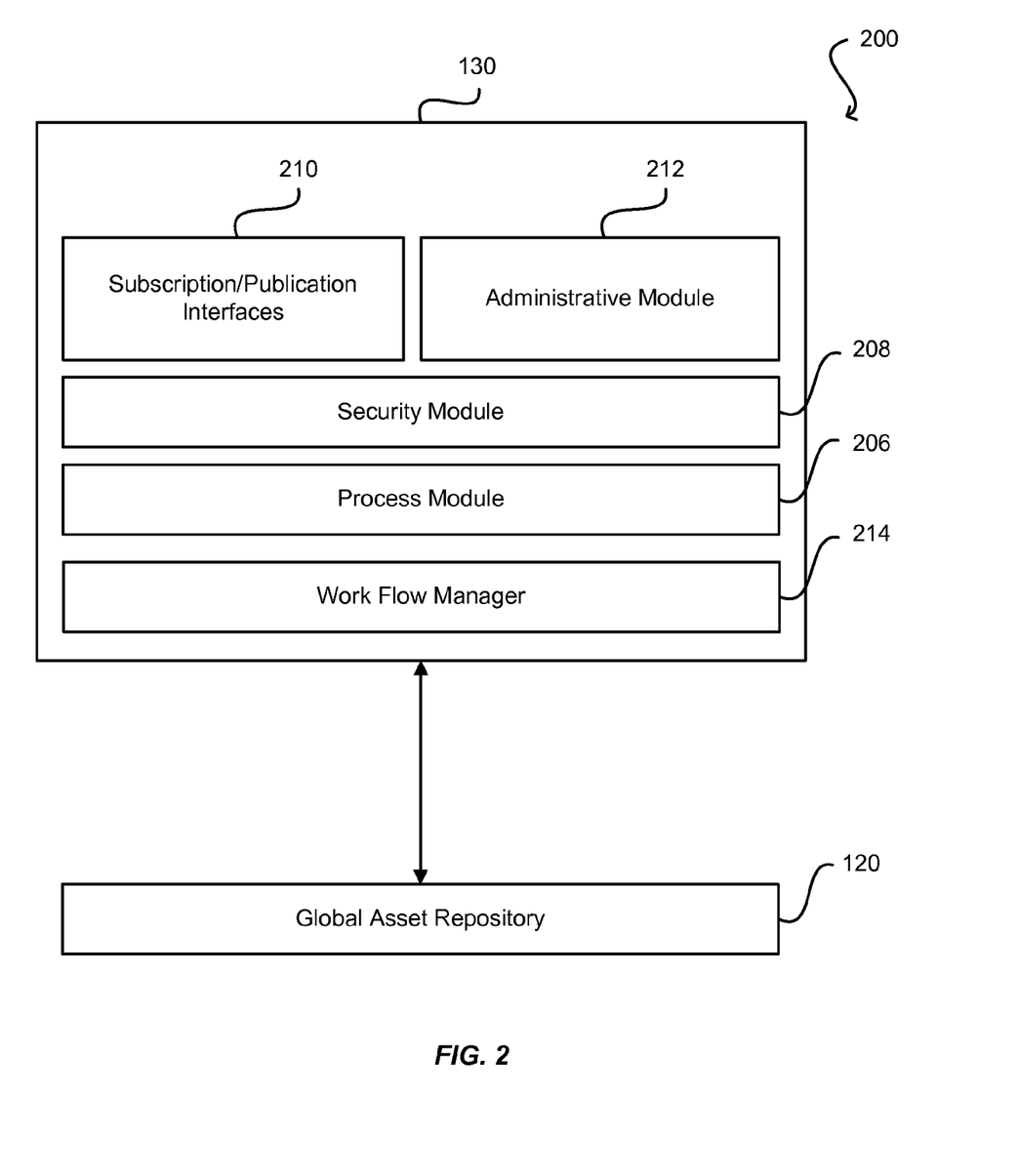
FIG. 2 illustrates a simplified block diagram of a global asset repository and a work management application in accordance with one embodiment of the present invention.

FIG. 2 illustrates a simplified block diagram 200 of the global asset repository 120 and the work management application 130 in accordance with one embodiment of the present invention. Global asset repository 120 includes global asset definitions. Work management application 130 includes process module 206, security module 208, subscription/publication interfaces 210, administrative module 212, and work flow manager 214. Unlike work management modules of disparate CRM and ERP/eAM systems, the work management application 130 manages the execution of various work flows for both customer-owned assets and internal assets. The work management application 130 also provides an overview of all the work that is being performed or will be performed.

Global asset repository 120 is configured to store global asset definitions associated with the enterprise. As used herein, "global asset definitions" represents information about the physical representation of assets associated with the enterprise, regardless of the asset ownership. The assets include customer-owned assets and/or enterprise-owned assets. As previously mentioned, assets may include (but are not limited to) products, machines and warehousing equipment for the manufacturing industry, transmission towers and generating equipment for the utility industry, oil rigs, ocean-based platforms, and pipelines for the oil and gas industry, and vehicles and machines for the waste management industry. In one embodiment, each instance of an asset may be represented as a separate record in the global asset repository 120. Each record may be associated with various data relating to the physical representation of the asset. Physical attributes include (but are not limited to) color, size, shape, nameplate data, engineering specifications, Bill of Materials, physical location such as address, meter definitions and counters, asset number, serial number, asset hierarchy, asset route, area, operational status, category identifier, asset check-in status, supplier warranty expiration date, owning department identifier, work-in-progress accounting code, service-level contracts, etc.

The global asset definition may also include ancillary attributes. These ancillary attributes may include (but are not limited to) maintenance attributes, such as frequency of maintenance checks, production attributes, such as efficiency of the asset and capacity of the asset, role attributes, field service attributes, depot repair attributes, and the like. Moreover, each record is further associated with a functional specification, such as the subject matter of the work (i.e., work statement) to be performed and the steps or tasks that are required to perform the work statement. The functional specification may be stored in a repository that is accessible by the work management application 130, such as repository 120 or a repository within the work management application 130.

In an exemplary embodiment, global asset repository 120 is implemented as a relational database or a collection of relational databases. In alternative embodiments, repository 120 may be implemented using any other logical storage format (e.g., flat file, etc.).

Work flow manager 214 comprises one or more software and/or hardware components that are configured to read the functional specification (including the work statement and associated steps/tasks) and in response to the functional specification, determine a work flow for the asset. The work flow manager 214 may further include a repository for all work flows associated with the assets in global asset repository 120. The work flow manager 214 may also manage the execution of the work flows.

Process module 206 consists of one or more software and/or hardware components that are configured to control access and updates to the global asset repository 120. In one embodiment, one or more subsystems cause new asset records to be created or cause existing records to be incrementally updated during the progression of a work flow. In one embodiment, the one or more subsystems request that a record be created or updated. The process module 206 may formulate and send a create or update request, such as a SQL statement, after performing reconciliation. Reconciliation is designed to improve the quality and integrity of global asset data since such data is typically updated from a number of different subsystems. One type of data reconciliation that may be performed is the resolution of data conflicts using one or more predefined business rules. A data conflict occurs when global asset repository 120 receives conflicting information from two or more subsystems. As described in further detail below, conflict resolution business rules may be defined by a user with appropriate privileges via administrative module 212.

A second type of reconciliation that may be performed by process 206 is the augmentation of data received from subsystems. In various embodiments, augmentation includes adding additional qualifiers or categorizations to the data that were not present in the request. This allows incoming data to be formatted and stored in a standardized form in global asset repository 120. Other types of reconciliation are also be performed.

Process module 206 may be implemented as any type of software/hardware component or combination of software/hardware components. For example, process module 206 may be implemented as one or more PL/SQL packages resident in global asset repository 120. Alternatively, process 206 may be implemented as one or more Java programs resident in an application server. In one embodiment, process 206 operates in real-time and reconciles global asset data as the data is published into global asset repository 120 during the progression of work flow. In other embodiments, process module 206 operates as a batch process and processes the global asset definitions stored in repository 120 at predefined intervals. One of ordinary skill in the art would recognize many variations, modifications, and alternatives.

Security module 208 comprises one or more rules defining the security privileges of end-users (e.g., subsystems) and administrators of installed base data hub 102. Exemplary rules include read-only access to installed base repository 204, read-write access, and the like. In an exemplary embodiment, one or more rules are associated with a security role, and one or more roles are associated with a user. For instance, a subsystem (e.g., user) may be assigned an "end-user" role consisting of read-write access to repository 120. A system administrator may be assigned a "super user" role consisting of additional privileges such as the ability to modify the configuration of security module 208, process module 206, and work flow manager 214. The security module 208 may be configurable based on a role and/or user security model.

In various embodiments, security module 208 also includes one or more software and/or hardware components for authenticating and authorizing users to global asset repository 120 according to the security rules defined. Security module 208 may implement any one of a number of known authentication/authorization mechanisms, such as username/password, cryptographic keys, and the like. One of ordinary skill in the art would recognize many variations, modifications, and alternatives.

Subscription and publication interfaces 210 enable subsystems such as 140, 142, 144, 146, 148, 150 to read and write data to global asset repository 120 respectively. In an exemplary embodiment, interfaces 210 are implemented as Application Programming Interfaces ("APIs") using a standardized invocation format and parameter model, thereby allowing any heterogeneous subsystem following the standardized format and model to access global asset repository 120. In one set of embodiments, subscription/publication interfaces 210 are implemented as Web Services. Interface 210 may also be implemented using any other standardized remote invocation interface such as CORBA, Java Remote Method Invocation ("RMI"), and the like. One of ordinary skill in the art would recognize many variations, modifications, and alternatives.

Administrative module 212 consists of a user interface for managing aspects of the global asset repository 120, process module 206, and security module 208. With respect to global asset repository 120, administrative module 212 may include functions for manually modifying the global asset definition data in the repository 120. With respect to the process module 206, administrative module 212 may include functions for defining business rules/logic for resolving data conflicts, and data augmentation. With respect to security module 208, administrative module 212 may include functions for creating security rules and roles, and defining the associations between each. With respect to work flow manager 214, administrative module 212 may include functions for creating and updating work flows associated with assets.

According to one set of embodiments, the user interface of administrative module 212 is implemented as a Web-based form. In other embodiments, the user interface may be implemented as any other type of software-based interface such as a proprietary application window, etc.

Figure 3:
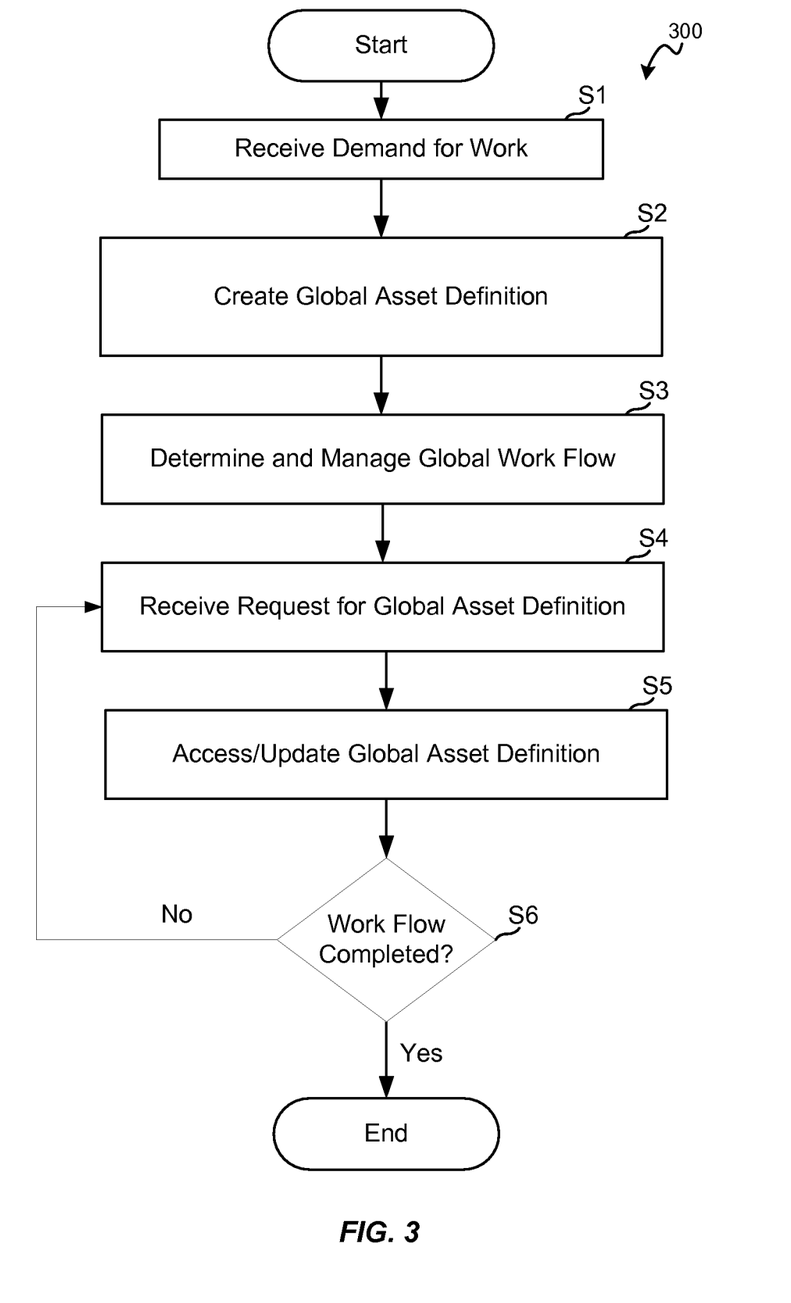
FIG. 3 is an exemplary process flow diagram which illustrates the steps performed in creating and updating a global asset repository in accordance with one embodiment of the present invention.

FIG. 3 is an exemplary process flow diagram 300 which illustrates the steps performed in creating and updating a global asset repository in accordance with one embodiment of the present invention. At step S1, demand for work is received from one or more subsystems, where the subsystem is associated with enterprise-owned assets or customer-owned assets. In one embodiment, the demand from work may originate from a production demand for a manufacturing product for a manufacturing work flow, a requisition form for a purchasing work flow, a sales order for a selling flow, demand from a capital project for a capital construction work flow, and a rental/lease request for a renting and leasing work flow.

At step S2, a global asset definition is created. In one embodiment, a new global asset definition is created for every instance of an asset. A user may define the subject matter of the work (i.e., statement of work) to be performed, such as "paint a transformer on an electric line." The steps or tasks that are required to perform the work statement are also determined. These steps/tasks are instructional statements that need to be performed in order to get the work done. In one embodiment, a user may define such steps/tasks manually or by selection from a library of steps available. For example, the determined steps may include: step A, disconnect the electric line from power source; step B, scrape-off the existing paint; step C, buff surface; step D, apply primer; and step E, apply paint.

In one embodiment, a user may define the asset by associating physical and ancillary attributes (as opposed to financial attributes) with the asset. By limiting the global asset definition to physical and ancillary attributes and excluding financial attributes, two separate and distinct asset definitions emerge—a global definition and a financial definition. Moreover, because the global asset definition is not segregated based on the ownership of the asset, the global asset definition can be originally initiated (and later accessed and updated) by any subsystem dealing with physical or ancillary representations of the asset within the work flow. In addition to associating the physical and ancillary attributes with the asset, the user may define the asset group attributes, asset hierarchy, and other attributes such as Connected-To, Member-Of, Upgraded-From, Installed-On, etc. Moreover, the user may specify a statement of work, which is the function of the asset and the role the asset will play for the enterprise. For example, a drill machine may be used by a manufacturing enterprise for purposes of production. A laptop computer may serve the purpose of bookkeeping for the manufacturing enterprise. After the asset and attributes have been defined, a work management application causes a new record to be created within the global asset repository comprising the specified attributes.

At step S3, a work flow associated with the global asset record is determined. In one embodiment, the definition of work (i.e., the work statement and associated steps required to perform the work statement) is used to determine the work flow in order to accomplish the work statement. The work flow may be predefined, such that one or more of the defined steps/tasks are associated with (or mapped to) a predefined work flow. In another embodiment, the user may manually create a work flow. As used herein, a work flow includes one or more detailed events which are performed in a specific sequence by one or more subsystems to accomplish the defined steps/tasks, regardless of the ownership of the asset. In other words, any single work flow may include activities performed by a combination of CRM subsystems and ERP/eAM subsystems. The work management application may manage the work flow.

During the course of the work flow associated with the global asset definition, at step S4, one or more subsystems may send a request to the work management application for the global asset definition. The request may be a read or write request.

At step S5, read access is provided or updates are performed in response to the received request. In one embodiment, the subsystem may update the global asset definition by sending a write request. Essentially, while operating on the single record, each subsystem may build-up the definition by adding and/or modifying attributes as needed by that subsystem. The asset record evolves as the business process or work flow progresses. The subsystems operate on a single source of truth by using the global asset repository, thus reducing redundancy and alleviating the need to perform synchronization among disparate asset definitions. In one embodiment, the request for global asset data may be sent by subsystems that are within the work flow but are concerned with the financial representation of the global asset. In such cases, the financial representation-based subsystem may create a copy of the global asset definition that is local to the subsystem. Financial attributes may be added to the local asset definition. This enables the financial flows to be separated from the physical and ancillary definition-based work flows.

At step S6, it is determined whether the work flow associated with the asset has been completed. If the work is completed, processing is complete. Otherwise, the work management application continues to service the requests by the subsystems during the course of the work flow by iterating back to step S4.

Figure 4:
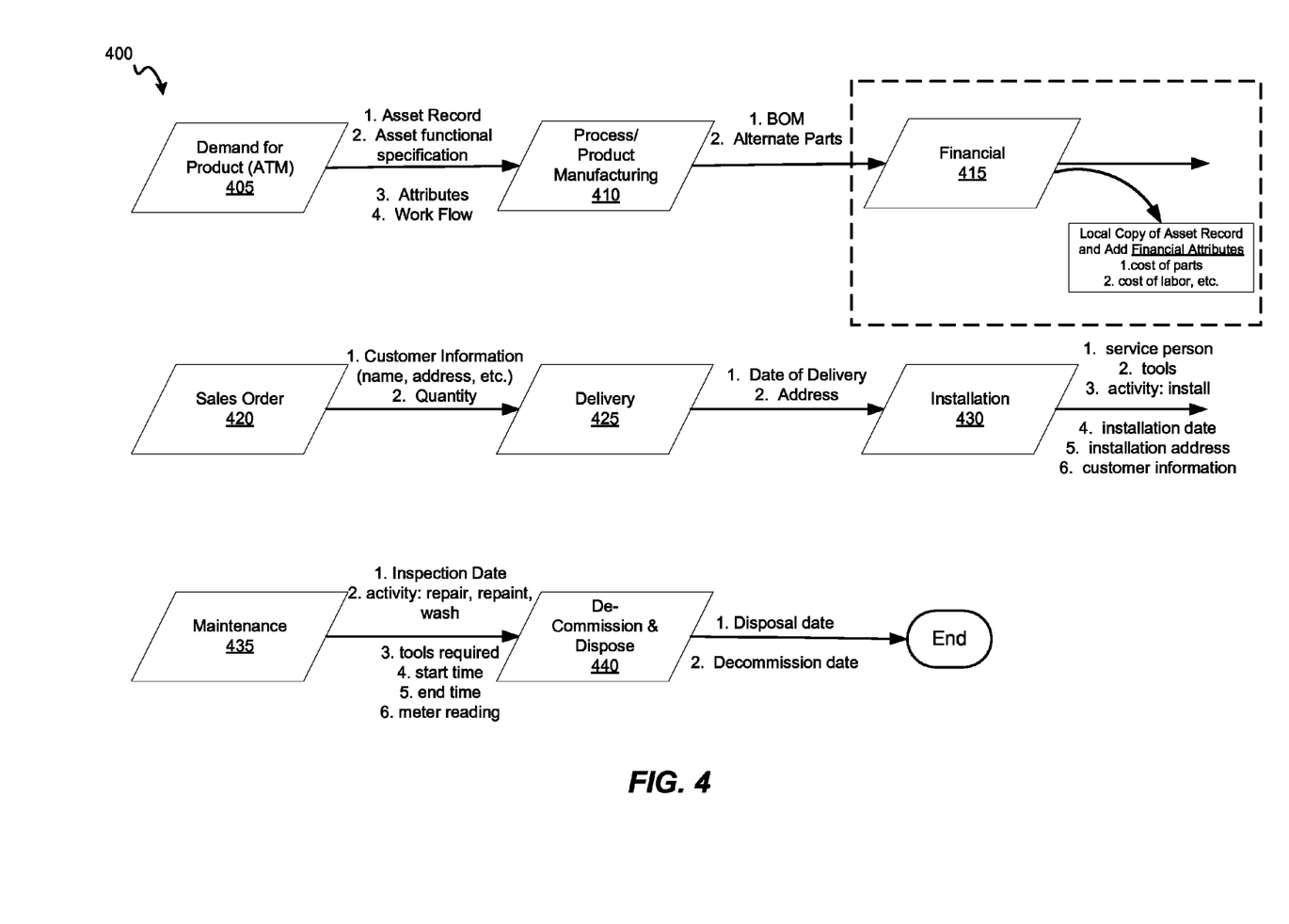
FIG. 4 illustrates an exemplary work flow using a global asset repository and work management application in accordance with one embodiment of the present invention.

FIG. 4 illustrates an exemplary flow 400 using a global asset repository and work management application in accordance with one embodiment of the present invention. For purposes of explanation, the flow 400 takes place in the context of a manufacturer of a product, such as a manufacturer of automated teller machine (ATM) machines. Flow 400 illustrates how a common data model for manufacturing assets, which includes physical and ancillary attributes of the assets (as opposed to financial attributes), can be used for both customer-owned assets and enterprise-owned assets. As such, the common data model is used by subsystems which deal with the physical and ancillary attributes of assets, regardless of the ownership status of the asset. Flow 400 also illustrates the evolution of a global asset definition through the asset lifecycle and progression of a work flow.

In one embodiment, a demand for work of a product, such as an ATM machine, is received by a manufacturing department as depicted in block 405. Demand may be received in many ways. For example, in a purchasing flow, demand may be received as a purchase requisition. In a selling flow, demand may be received as a purchase order. Other known methods of demand intake are also contemplated without departing from the scope of the embodiments described herein. In one embodiment, the demand intake and processing is performed by a work management application.

Once the demand for work is received, a new record is created for the demanded asset, whether it be a customer asset or an internal asset. Each instance of an asset creates a new record in the global asset repository. A functional role of the asset is specified, along with physical/ancillary attributes. The functional specification and attributes are stored in the new record thus creating a global asset definition for that instance of the asset. Moreover, a work flow is determined for the new asset.

In this embodiment, the defined work flow requires a process/product manufacturing subsystem to perform production scheduling and other functions at block 410. The process/product manufacturing subsystem executes its functions and adds additional attributes to the global asset definition as required by those functions. As depicted, a bill of materials (BOM) attribute is added along with an alternative parts attribute. Next, the work flow requires that a financial subsystem determine a budget, generate an approval, and perform other financial-type processing at block 415. Because the financial subsystem deals with the financial representation of the asset (rather than the physical/ancillary representation), the work management application may disseminate a copy of the global asset definition. The financial subsystem may store the asset definition as a local copy. Financial attributes, such as cost of parts, and cost of labor, may be added to the local asset definition as required.

The work flow continues to block 420, where a sales order is received by the manufacturing enterprise. At this point in the work flow, the asset transforms from an enterprise manufacturing asset into a customer-owned asset. It should be recognized that regardless of the ownership of the asset, subsystems from both enterprise and customer-based systems can operate on a common data model, e.g., the global asset definition. The sales order subsystem adds customer information attributes, quantity ordered attribute, and other various attributes to the global asset definition as needed by that subsystem. Progressing through the workflow, a delivery subsystem performs various functions at block 425. The delivery subsystem adds delivery-related attributes, such as date of delivery and delivery address. Next, the work flow continues to an installation subsystem at block 430, which adds installation-related attributes such as identification of the service personnel performing the installation, tools required, the activity performed (installation), the date of installation, address of installation, and customer information.

The work flow continues to block 435, where a maintenance subsystem performs various functions. The maintenance subsystem may add attributes to the global asset definition such as the inspection date, activity (e.g., repair, wash, repaint, etc.), tools required, start and end time of activity, and meter readings. Finally, the lifecycle of the asset comes to an end where the asset is decommissioned and disposed at block 440. Attributes related to the disposal date and decommission date may be added to the global asset definition.

As such, the global asset repository provides a single, common asset definition for both enterprise-owned and customer-owned assets. The physical location of the asset is trackable by the addition of various location and address attributes. Moreover, attributes may be provided to support asset movement (transactable asset) such as for inventory transactions or physical location updates. Further, the global asset definition enables assets which are defined by a non-eAM system (such as a CRM system) to be maintained through a portion of the asset lifecycle by a servicing eAM system. In addition to the global asset repository, the single work management application layer has numerous benefits. In the absence of a consolidated CRM or ERP system, the work management application consolidates the functionalities of the otherwise separate work management systems, where each separate work management system is associated with a distinct subsystem.

Figure 5:
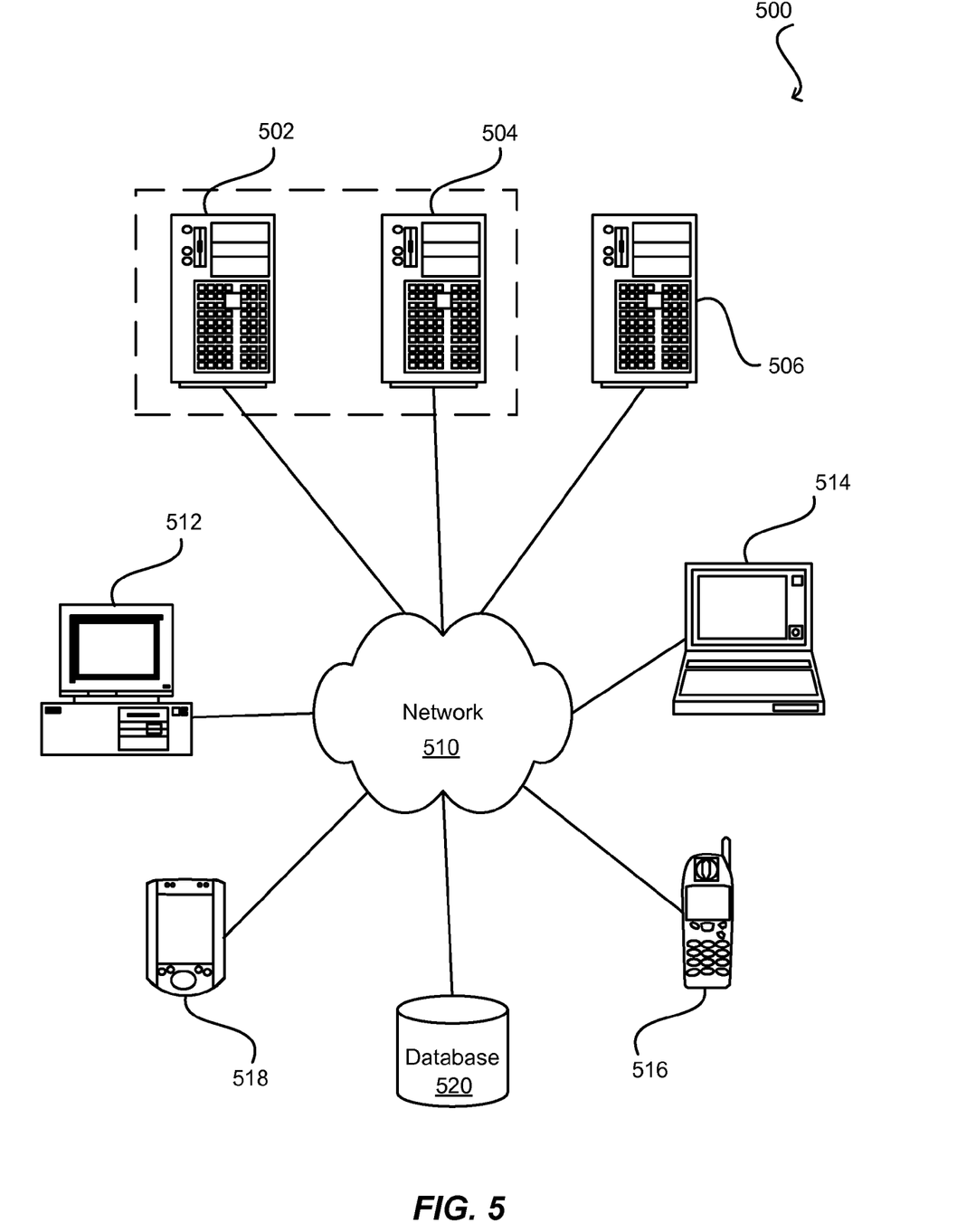
FIG. 5 is a block diagram illustrating components of an exemplary operating environment in which various embodiments of the present invention may be implemented.

FIG. 5 is a block diagram illustrating components of an exemplary operating environment in which various embodiments of the present invention may be implemented. The system 500 can include one or more user computers, computing devices, or processing devices 512, 514, 516, 518, which can be used to operate a client, such as a dedicated application, web browser, etc. The user computers 512, 514, 516, 518 can be general purpose personal computers (including, merely by way of example, personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 512, 514, 516, 518 may also have any of a variety of applications, including one or more development systems, database client and/or server applications, and Web browser applications. Alternatively, the user computers 512, 514, 516, 518 may be any other electronic device, such as a thin-client computer, Internet-enabled gaming system, and/or personal messaging device, capable of communicating via a network (e.g., the network 510 described below) and/or displaying and navigating Web pages or other types of electronic documents. Although the exemplary system 500 is shown with four user computers, any number of user computers may be supported.

In most embodiments, the system 500 includes some type of network 510. The network may can be any type of network familiar to those skilled in the art that can support data communications using any of a variety of commercially-available protocols, including without limitation TCP/IP, SNA, IPX, AppleTalk, and the like. Merely by way of example, the network 510 can be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks.

The system may also include one or more server computers 502, 504, 506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 506) may be dedicated to running applications, such as a business application, a Web server, application server, etc. Such servers may be used to process requests from user computers 512, 514, 516, 518. The applications can also include any number of applications for controlling access to resources of the servers 502, 504, 506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 512, 514, 516, 518. As one example, a server may execute one or more Web applications. The Web application may be implemented as one or more scripts or programs written in any programming language, such as Java, C, C# or C++, and/or any scripting language, such as Perl, Python, or TCL, as well as combinations of any programming/scripting languages. The server(s) may also include database servers, including without limitation those commercially available from Oracle, Microsoft, Sybase, IBM and the like, which can process requests from database clients running on a user computer 512, 514, 516, 518.

The system 500 may also include one or more databases 520. The database(s) 520 may reside in a variety of locations. By way of example, a database 520 may reside on a storage medium local to (and/or resident in) one or more of the computers 502, 504, 506, 512, 514, 516, 518. Alternatively, it may be remote from any or all of the computers 502, 504, 506, 512, 514, 516, 518, and/or in communication (e.g., via the network 510) with one or more of these. In a particular set of embodiments, the database 520 may reside in a storage-area network ("SAN") familiar to those skilled in the art. Similarly, any necessary files for performing the functions attributed to the computers 502, 504, 506, 512, 514, 516, 518 may be stored locally on the respective computer and/or remotely, as appropriate. In one set of embodiments, the database 520 may be a relational database, such as Oracle 10g, that is adapted to store, update, and retrieve data in response to SQL-formatted commands.

Figure 6:
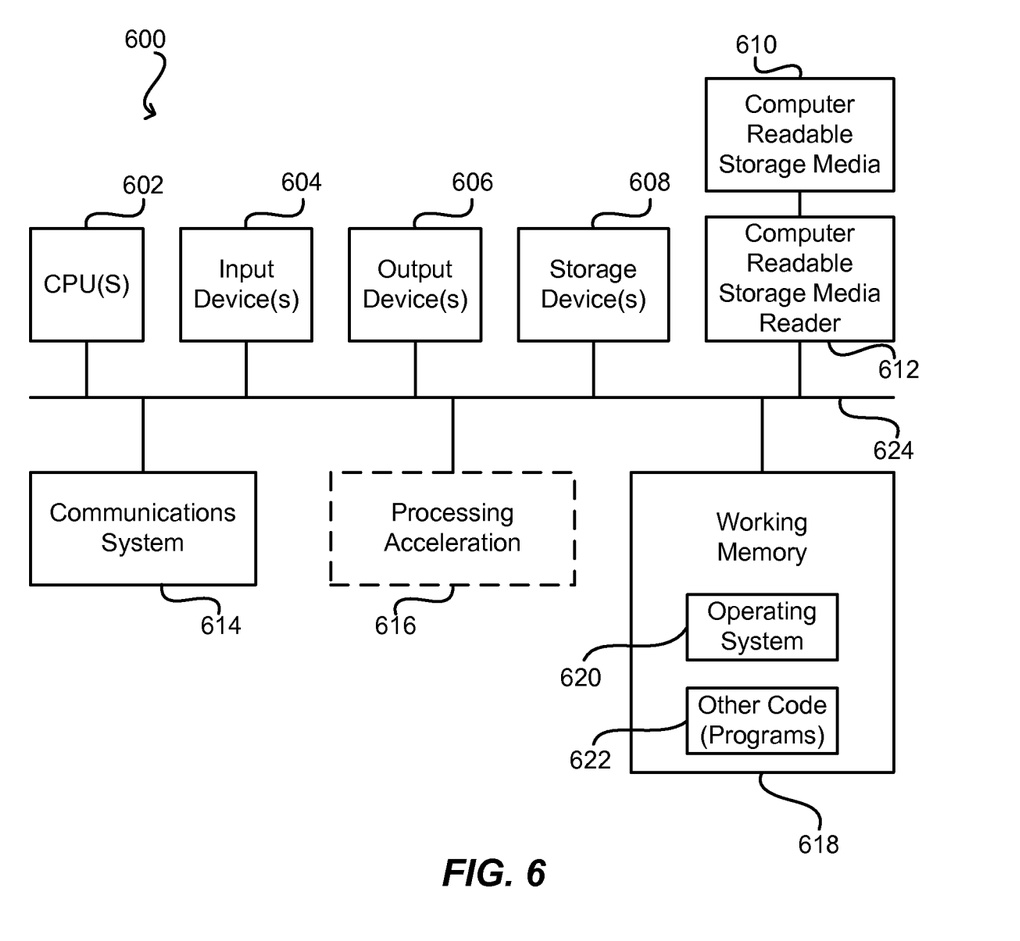
FIG. 6 illustrates an exemplary computer system in which various embodiments of the present invention may be implemented.

FIG. 6 illustrates an exemplary computer system 600, in which various embodiments of the present invention may be implemented. The system 600 may be used to implement any of the computer systems described above. The computer system 600 is shown comprising hardware elements that may be electrically coupled via a bus 624. The hardware elements may include one or more central processing units (CPUs) 602, one or more input devices 604 (e.g., a mouse, a keyboard, etc.), and one or more output devices 606 (e.g., a display device, a printer, etc.). The computer system 600 may also include one or more storage devices 608. By way of example, the storage device(s) 608 can include devices such as disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 612, a communications system 614 (e.g., a modem, a network card (wireless or wired), an infra-red communication device, etc.), and working memory 618, which may include RAM and ROM devices as described above. In some embodiments, the computer system 600 may also include a processing acceleration unit 616, which can include a digital signal processor DSP, a special-purpose processor, and/or the like.

The computer-readable storage media reader 612 can further be connected to a computer-readable storage medium 610, together (and, optionally, in combination with storage device(s) 608) comprehensively representing remote, local, fixed, and/or removable storage devices plus storage media for temporarily and/or more permanently containing computer-readable information. The communications system 614 may permit data to be exchanged with the network and/or any other computer described above with respect to the system 600.

The computer system 600 may also comprise software elements, shown as being currently located within a working memory 618, including an operating system 620 and/or other code 622, such as an application program (which may be a client application, Web browser, mid-tier application, RDBMS, etc.). It should be appreciated that alternate embodiments of a computer system 600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims. For example, the teachings herein may be extended to cover default configuration for other data visualizations. The scope of the invention should, therefore, be determined not with reference to the above description, but instead should be determined with reference to the pending claims along with their full scope or equivalents.

What is claimed is:

1. An information management system providing a consolidated representation of a plurality of assets, the plurality of assets being physical objects associated with a plurality of disparate application systems, the system comprising:
   a data storage medium operable to store a plurality of global asset definitions representing enterprise-owned assets and customer-owned assets:
      wherein the enterprise-owned assets and the customer-owned assets are consolidated into a single repository in the data storage medium;
      wherein a global asset definition of the plurality of global asset definitions is stored as a record of an asset of the plurality of assets;
      wherein the global asset definition includes a functional specification of the asset and a physical attribute of the asset;
      wherein the customer-owned assets have been purchased and are owned by customers of the enterprise;
      wherein the single repository is administered by the enterprise; and
      wherein the global asset definition is transformed from an enterprise-owned asset into a customer-owned asset within the single repository; and
   a work management application server computer communicatively coupled to the data storage medium and providing a work flow manager operable to determine and manage the execution of a work flow associated with the global asset definition, the work flow including one or more tasks to be performed by one or more subsystems of the plurality of disparate application systems for accomplishing the functional specification, wherein the work flow spans across the plurality of disparate application systems.

2. The system of claim 1, further comprising:
   a process module operable to cause the record of the global asset definition in the data storage medium to be updated by adding one of a physical attribute of the asset and an ancillary attribute of the asset in response to a request from a subsystem of the one or more subsystems that uses a physical representation of the asset, wherein the process module prevents a subsystem of the one or more subsystems that uses a financial representation of the asset from updating the global asset definition.

3. The system of claim 1, further comprising:
   a process module configured to cause the data storage medium to create the record of the global asset definition.

4. The system of claim 1, wherein the process module causes the data storage medium to update the global asset definition by generating an update request as a structured query language statement and sending the update request to the data storage medium.

5. The system of claim 1, further comprising:
   a security module configured to manage access to the data storage medium;
   a subscription interface configured to enable the one or more subsystems of the plurality of disparate application systems to read data from the data storage medium; and
   a publication interface configured to enable the one or more subsystems of the plurality of disparate application systems to write data into the data storage medium.

6. The system of claim 5, further comprising a administrative module configured to allow management of the data storage medium, the security module, and the work flow manager.

7. The system of claim 1, wherein each instance of the asset of the plurality of assets is represented by a unique record in the data storage medium.

8. The system of claim 1, wherein the global asset definition excludes attributes describing financial features of the asset.

9. The system of claim 1, wherein the functional specification includes a statement of work identifying a subject matter of work to be performed, and the one or more tasks are required to accomplish the statement of work.

10. The system of claim 1, wherein the functional specification is user-defined.

11. The system of claim 1, wherein the work flow is user-specified.

12. The system of claim 1, wherein the process module is operable to disseminate a copy of the global asset definition to a financial subsystem of the plurality of disparate application systems, and further comprising:
   a local data storage medium associated with the financial subsystem configured to store the local copy of the global asset definition and an attribute describing a financial feature of the asset.

13. The system of claim 1, wherein the subscription interface and the publication interface are implemented as Web Services.

14. The system of claim 1, wherein the security module comprises a plurality of rules, one or more rules in the plurality of rules being associated with a user role, the user role being associated to a user of the work management application server computer.

15. A method for providing a consolidated representation of a plurality of assets, the plurality of assets being physical objects associated with a plurality of disparate application systems, the method comprising:
   storing, at a data storage medium, a plurality of global asset definitions representing enterprise-owned assets and customer-owned assets in a single repository, a global asset definition of the plurality of global asset definitions being stored as a record of an asset of the plurality of assets, the global asset definition including a functional specification of the asset and a physical attribute of the asset, wherein the customer-owned assets have been purchased and are owned by customers of the enterprise, and wherein the single repository is administered by the enterprise;

transforming the global asset definition from an enterprise-owned asset into a customer-owned asset within the single repository;

determining, by a work management application server computer, a work flow associated with the global asset definition, the work flow including one or more tasks to be performed by one or more subsystems of the plurality of disparate application systems for accomplishing the functional specification, wherein the plurality of disparate application systems comprise a customer relationship management (CRM) system and an enterprise resource planning (ERP) server and wherein the work flow encompasses processes performed by a combination of the CRM system and the ERP system; and managing, by the work management application server computer, the execution of the work flow.

16. The method of claim 15, further comprising:
receiving a request to update the record of the global asset definition from a subsystem of the one or more subsystems that uses a physical representation of the asset and does not use a financial representation of the asset; and servicing the request by updating the record of the global asset definition in the data repository by adding one of a physical attribute of the asset and an ancillary attribute of the asset in response to the request.

17. The method of claim 15, further comprising:
managing access to the data repository;
enabling the one or more subsystems of the plurality of disparate application systems to read data from the data repository; and
enabling the one or more subsystems of the plurality of disparate application systems to write data into the data repository.

18. The method of claim 15, wherein each instance of the asset of the plurality of assets is represented by a unique record in the data repository.

19. The method of claim 15, wherein the global asset definition excludes attributes describing financial features of the asset.

20. A non-transitory computer program product embedded in a non-transitory computer readable medium for providing a consolidated representation of a plurality of assets, the plurality of assets being physical objects associated with a plurality of disparate application system, comprising:

program code for storing a plurality of global asset definitions representing enterprise-owned assets and customer-owned assets in a single repository, a global asset definition of the plurality of global asset definitions being stored as a record of an asset of the plurality of assets, the global asset definition including a functional specification of the asset and a physical attribute of the asset, wherein the customer-owned assets have been purchased and are owned by customers of the enterprise, and wherein the single repository is administered by the enterprise;

program code for transforming the global asset definition from an enterprise-owned asset into a customer-owned asset within the single repository;

program code for determining a work flow associated with the global asset definition, the work flow including one or more tasks to be performed by one or more subsystems of the plurality of disparate application systems for accomplishing the functional specification, wherein at least one segment of the work flow is automatically determined by a mapping of a task of the one or more tasks with a predefined work flow; and program code for managing the execution of the work flow.

21. The non-transitory computer program product of claim 20, further comprising:
program code for receiving a request to update the record of the global asset definition from a subsystem of the one or more subsystems that uses a physical representation of the asset and does not use a financial representation of the asset; and program code for servicing the request by updating the record of the global asset definition in the data repository by adding one of a physical attribute of the asset and an ancillary attribute of the asset in response to the request.

22. The non-transitory computer program product of claim 20, wherein the global asset definition excludes attributes describing financial features of the asset.

* * * * *